United States Patent [19]

Hanscom et al.

[11] Patent Number: 4,596,901
[45] Date of Patent: Jun. 24, 1986

[54] TELEPHONE ANSWERING MACHINE WITH REMOTE CONTROL CAPABILITIES

[75] Inventors: Bradford E. Hanscom, Downey; Gerald L. Mock, Corona, both of Calif.

[73] Assignee: T.A.D. Avanti, Inc., Compton, Calif.

[21] Appl. No.: 579,779

[22] Filed: Feb. 13, 1984

[51] Int. Cl.⁴ ............................................ H04M 1/64
[52] U.S. Cl. .................................... 179/6.07; 179/6.1; 179/6.11
[58] Field of Search ....................... 179/6.01, 6.07–6.1, 179/6.11–6.13, 6.14, 6.03; 360/55, 69, 71, 74.1, 74.4

[56] References Cited

U.S. PATENT DOCUMENTS 3,991,274 11/1976 Darwood ............................ 179/6.11
4,469,919 9/1984 Nakamura et al. ................. 179/6.06

FOREIGN PATENT DOCUMENTS 2033698 5/1980 United Kingdom ............... 179/6.11

Primary Examiner—Robert L. Richardson
Attorney, Agent, or Firm—Keith D. Beecher

[57] ABSTRACT

A telephone answering machine with remote control capabilities which responds to remote control signals received over the telephone line after the termination of an announcement interval ($T_1$) to play back previously recorded messages over the telephone line to the calling party. The machine is susceptible to a number of controlled operations such as the playback of all previously recorded messages, playback of new messages only, remote changing of the announcement, remote backspacing control, selective erasure of the messages after playback, providing an indication to the calling party as to whether any new messages have been recorded since his last remote operation, and other controlled operations to be described.

8 Claims, 9 Drawing Figures

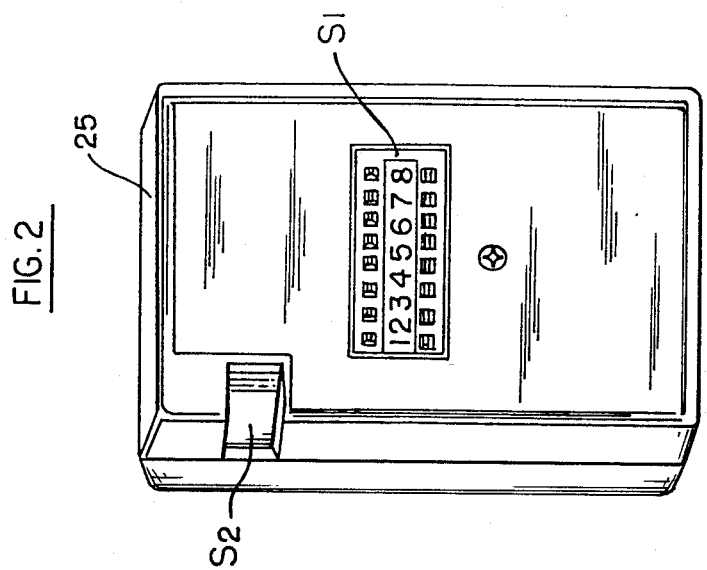
FIG. 2
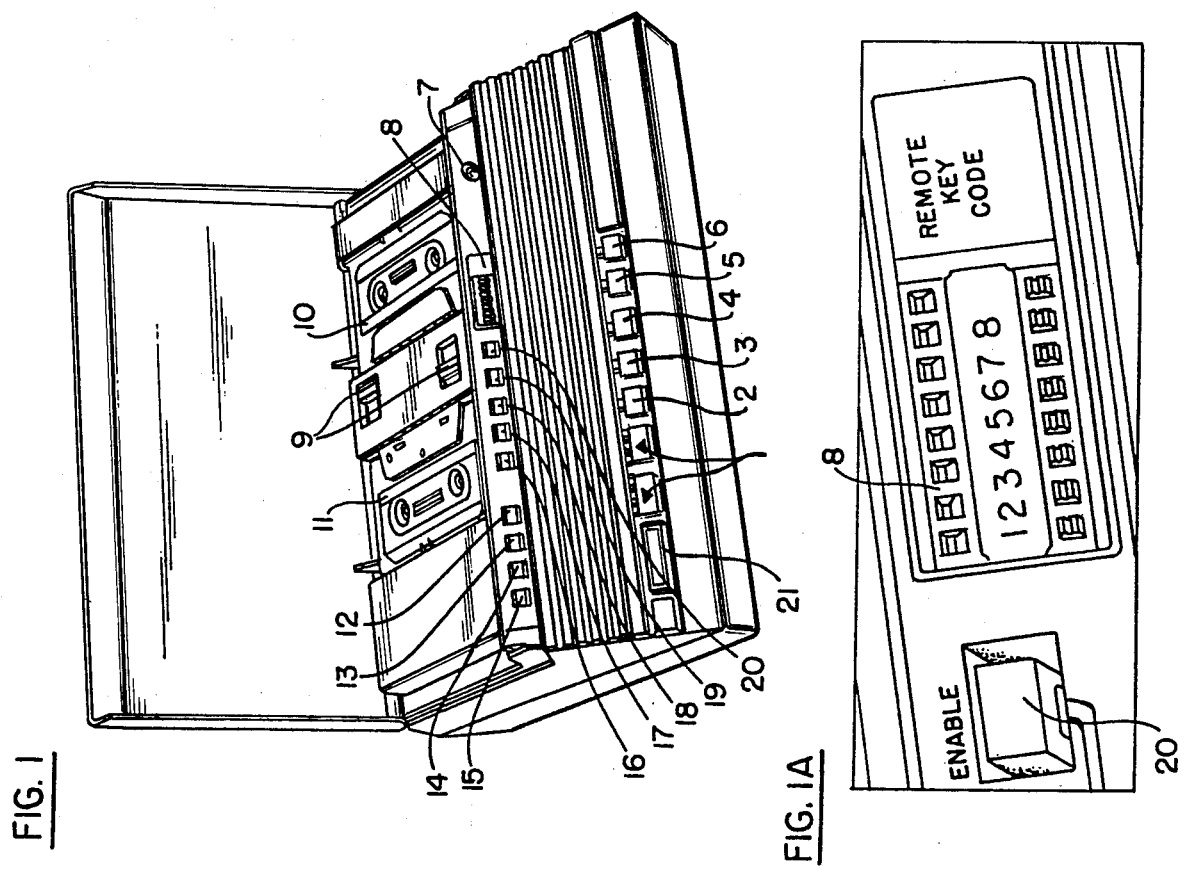
FIG. 1
FIG. 1A

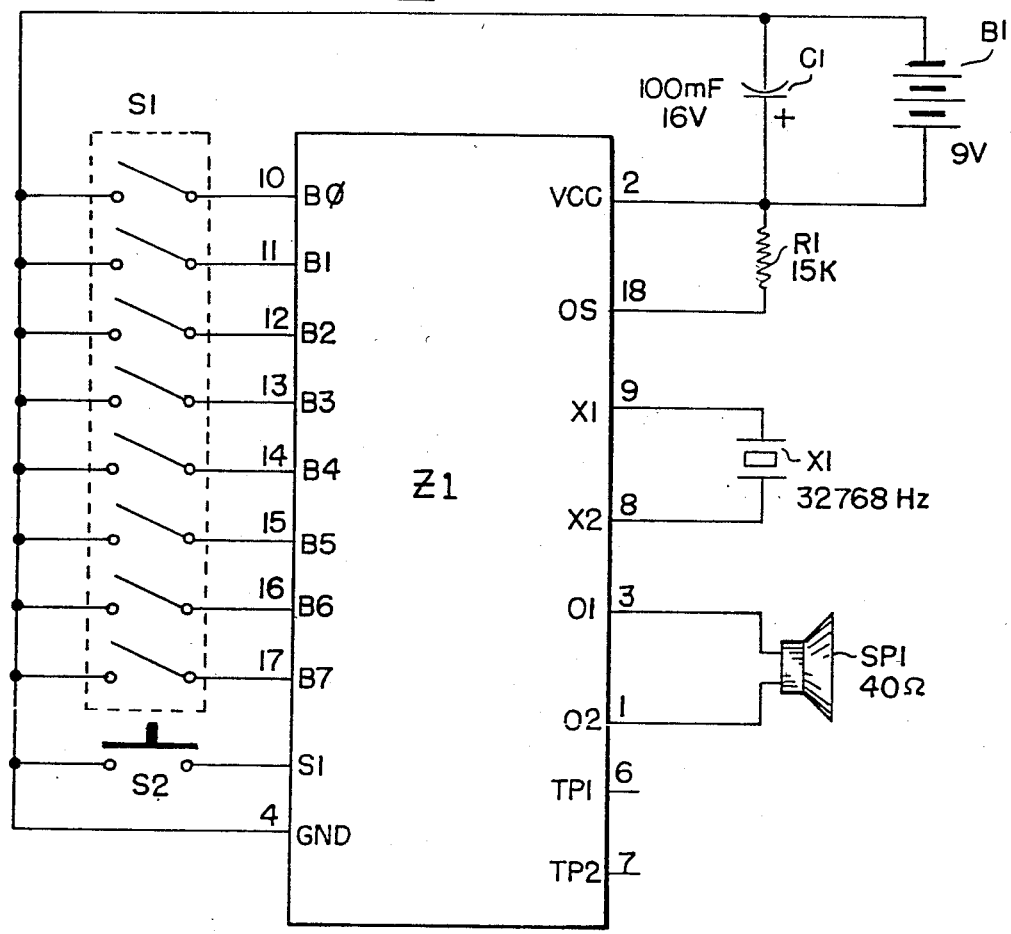

TELEPHONE ANSWERING MACHINE WITH REMOTE CONTROL CAPABILITIES

BACKGROUND OF THE INVENTION

The machine of the invention is of the same general type as described in Copending application Ser. No. 523,115, filed Aug. 1, 1983 and now U.S. Pat. No. 4,549,046, and in Copending application Ser. No. 301,740, filed Sept. 14, 1981, both of which are assigned to the present Assignee. The telephone answering machine described in the Copending Applications is one which includes a first magnetic tape cassette (T-1) on which an announcement is recorded, and which is activated during an announcement interval ($T_1$) in response to a telephone call, causing the recorded announcement to be transmitted over the telephone line to the calling party during that interval. The machine also includes a second magnetic tape cassette (T-2) on which incoming messages are recorded. At the end of the announcement interval ($T_1$) the message tape (T-2) is activated, so that the message transmitted over the telephone line by the calling party during a following time interval ($T_2$) may be recorded.

The remote control of the telephone answering machine described in the Copending Applications, and of the telephone answering machine of the present invention, may be achieved by means of a small portable transmitter unit which is held up by the calling party to the mouthpiece of a telephone, and which is pushbutton controlled to transmit remote control tone signals over the telephone line. The telephone answering machine of the present invention, like the system described in Copending application Ser. No. 301,740, is designed to respond to a particular coded control tone signal to activate a remote control circuit, so that the message tape cassette may be rewound and then set to a playback condition in order that the messages recorded on the message tape may be successively transmitted over the telephone line to the calling party.

In the system of the present invention, a coded remote control signal is sent to the telephone answering machine by the calling party over the telephone line after the ($T_1$) announcement interval has been completed. When the coded remote control signal is received by the machine, it is decoded and fed to a microcomputer which is included in the machine and which controls its operation.

BRIEF DESCRIPTION OF THE DRAWINGS

FIG. 1 is a perspective representation of a telephone answering machine which may be remotely controlled, and which incorporates a number of switches that are set to predetermined positions to enable access to the unit only when tone signals of a predetermined coded configuration are received over the telephone line;

FIG. 1A is a fragmentary enlarged portion of the telephone answering machine shown in FIG. 1, and showing how the switches may be set to any selected code;

FIG. 2 is a perspective view of a remote control unit for operating the telephone answering machine of FIG. 1, and which includes a like number of switches for coding the tone signals sent over the telephone line;

FIG. 3 is a schematic diagram of the electronic circuitry included in the remote control unit of FIG. 2;

FIG. 6 is a representation of the binary coded tone signals transmitted from the control unit of FIG. 2 over the telephone line to the telephone answering machine of FIG. 1.

DETAILED DESCRIPTION OF THE ILLUSTRATED EMBODIMENT

Figure 4A:
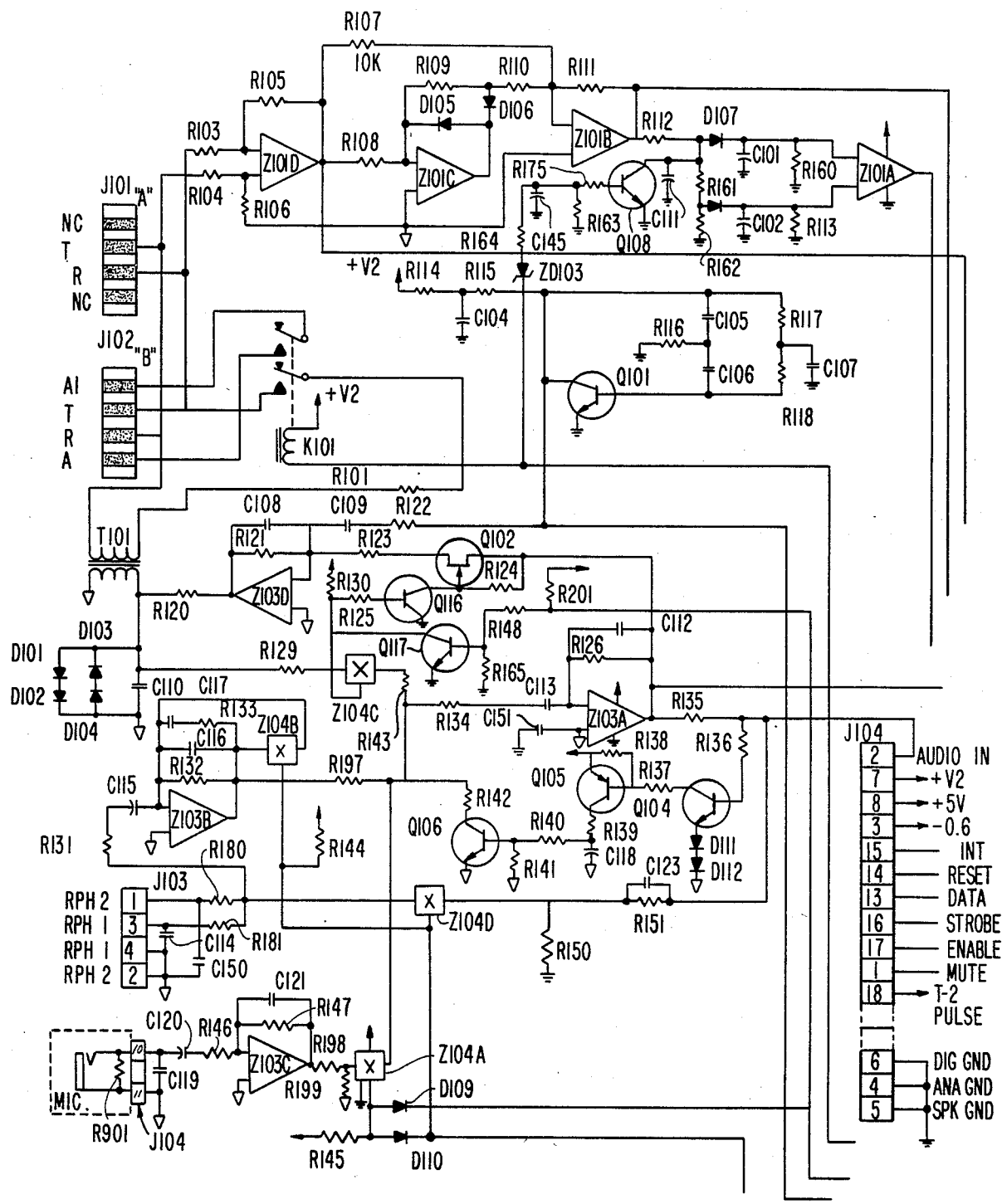
FIGS. 4A and 4B, 5A and 5B are schematic circuit diagrams of the electronic circuitry included in the telephone answering machine of FIG. 1.

The telephone answering machine shown in FIG. 1 includes UP/DOWN keys 1 which are used to adjust volume; a STOP key 2 which is used to suspend any function; a REWIND key which is used to rewind the message tape, and a PLAY key 4 which is used to play back received messages. The machine also includes a 2-WAY key 5 which is used to record two-way conversations; and an ANSWER key 6 which is actuated to answer the telephone and take messages.

Also included in the system is a microphone jack 7. A microphone may be plugged into jack 7 to dictate notes on the message tape T-2 upon actuation of pushbutton 15. The unit also includes a series of code switches 8 which, in the illustrated embodiment are eiqht in number. The code switches 8 may be set to any predetermined code, as shown in FIGURE 1A, by operating each individual switch by a pencil, for example, to establish it in either the binary "1" position or in the binary "0" position.

Cassette eject levers 9 are provided to eject either the incoming message cassette 10 (T-2) or the outgoing announcement cassette 11 (T-1). A RING SELECT pushbutton 12 is provided which is used to select the number of rings to be received before the machine will answer. VOX time pushbuttons 13 and 14 are provided. When pushbutton 13 is actuated, a message may be recorded so long as the calling party is speaking, without any time limit. When pushbutton 14 is actuated, an incoming message is recorded on the message tape so long as the calling party is speaking, but up to a 200 second adjustable maximum.

The telephone answering machine also includes two announcement pushbuttons 16 and 17. When pushbutton 16 is operated, the outgoing announcement may be monitored; and when pushbutton 17 is actuated together with an ENABLE pushbutton 20, the outgoing announcement may be recorded. Also included in the machine are MESSAGE pushbuttons 18 and 19. When pushbutton 18 is actuated together with ENABLE pushbutton 20, the messages are erased. When the pushbutton 19 is actuated, the message tape (T-2) is scanned at a faster speed than normal. A digital display is also provided, which will be described.

The telephone answering machine of FIG. 1 is operated by a remote control unit 25, shown in FIG. 2. The remote control unit 25 includes a number of coding switches S1 corresponding to the switches 8 on the telephone answering machine, as shown in FIGS. 1 and 1A. These switches S1 at the coding unit are set to the same code as the switches 8 of FIG. 1A, to permit access to the machine when the remote control unit 25 is operated. Both the switches 8 and S1 may be set by the point of a pencil, as shown in FIG. 1A, or by a similar tool.

When the user wishes to receive at a remote telephone the telephone messages recorded on the telephone answering machine of FIG. 1, he calls his telephone number from the remote telephone. This causes the telephone answering machine to come on the line. At the end of the announcement the user holds the remote control unit 25 to the mouthpiece of the remote telephone, and presses a key S2. This causes the remote control unit to transmit a remote control signal, coded as shown in FIG. 6, over the telephone line to access and operate the telephone answering machine of FIG. 1. In response to the coded remote control signal the machine will transmit over the telephone line all of the messages that have been accumulated in the machine since the last remote operation.

Specifically, in order for the user to obtain his messages by remote control, he first calls up his telephone. He will then hear the outgoing announcement which is followed by a beep tone. Right after the beep tone, he presses key S2 of FIG. 2 for less than 1 second, which causes a short coded remote control signal to be sent over the telephone line to the machine of FIG. 1. The machine will then send out a series of rapid beeps followed by four seconds of silence. Then if there are no new messages, the user can transmit a long coded remote control signal which lasts at least three seconds long, and the machine will play back the old messages. If there are new messages, the message tape (T-2) of the machine will rewind back to the point of the last remote operation and it will play back the new messages. While the message tape is rewinding, the machine will transmit a beep every two seconds over the telephone line.

When the telephone answering machine is playing back messages, it transmits a one second beep tone after each message. If the user wants that message repeated, he transmits a short coded remote control signal. If the user wants to backspace, he transmits a continuous coded remote control signal and the message tape will back up for as long as the signal continues and will then automatically resume its playback operation. After the backspacing operation, the user can again transmit a long coded remote control signal for more backspacing, or he can transmit a short coded remote control signal to cause the machine to skip forward to the point at which backspacing was started. These latter operations are initiated after a one second coded command tone is received from the machine at the completion of a message.

When there are no more messages recorded on the message tape (T-2), the machine will transmit a series of rapid beeps over the telephone line. If the user wishes the messages to be saved, he hangs up. However, if the caller sends the short coded remote control signal at that time, the message tape will rewind and the current messages will be erased. As the message tape is rewinding, it transmits a beep which tells the user he can hang up.

The announcement recorded on the announcement tape (T-1) can also be changed by remote control. This is achieved by the caller transmitting the short coded command signal after the beep at the end of the announcement. The machine will then signal back to the caller with a series of beeps. If the caller again sends the short coded command signal immediately after the series of beeps, the machine will rewind the announcement tape T-1, and then it will transmit a one second beep tone signifying to the caller that he can now record the new announcement. The caller may now record the new announcement on the T-1 tape. At the end of the announcement, the caller must again send the short coded control signal to the machine so that the beep signal indicating the end of the announcement may be recorded on the T-1 tape. The T-1 tape is then rewound and the new announcement is played over the telephone line. The caller may now hang up, or he can send the short code command tone and receive any new messages that have been recorded on the T-2 tape, or he can leave a message for himself.

The electronic circuitry of the remote control unit 25 of FIG. 2, as shown in FIG. 3, includes a custom integrated circuit Z1, and associated circuitry, as indicated. The integrated circuit Z1 is constructed by Silicon Systems Incorporated of Tustin, Calif. and designated by them as Specification No. 17C 265H.

The custom integrated circuit contains an oscillator, a 32-bit shift register, word counter, frequency dividers and a digital-to-analog converter (DAC). The control unit is activated when the user pushes the pushbutton S2, grounding the pin S1. Two sequences of thirty-two 31.25 millisecond tone bursts (bits) are generated, with binary "0" being 683 Hz and with binary "1" being 1024 Hz in a constructed embodiment. The bit pattern is as shown in FIG. 6, namely 00000000000000001110, and an 8-bit code set by the user in the positions of switches S1, and a trailing 01 sequence. The output waveform is a five level staircase approximation to a sine wave which drives speaker SP1 directly. After generating two sequences of the signal shown in FIG. 6, the control unit returns to a quiescent state until reactivated by operating the key S2.

Resistor R1 is a level setting resistor, capacitor C1 provides alternating current bypass control around battery B1. X1 is a 32768 Hz quartz crystal, and SP1 is a 40 ohm speaker. When the key S2 is depressed, the oscillator frequency divided by 1024 (32 Hz) can be observed at pin 6 (TP1) using a high impedance unit (10 megohms or greater) oscilloscope. Pin 7 (TP2) will display a 1–0 pattern representing a 1024 Hz–683 Hz transmitted code.

Figure 4B:
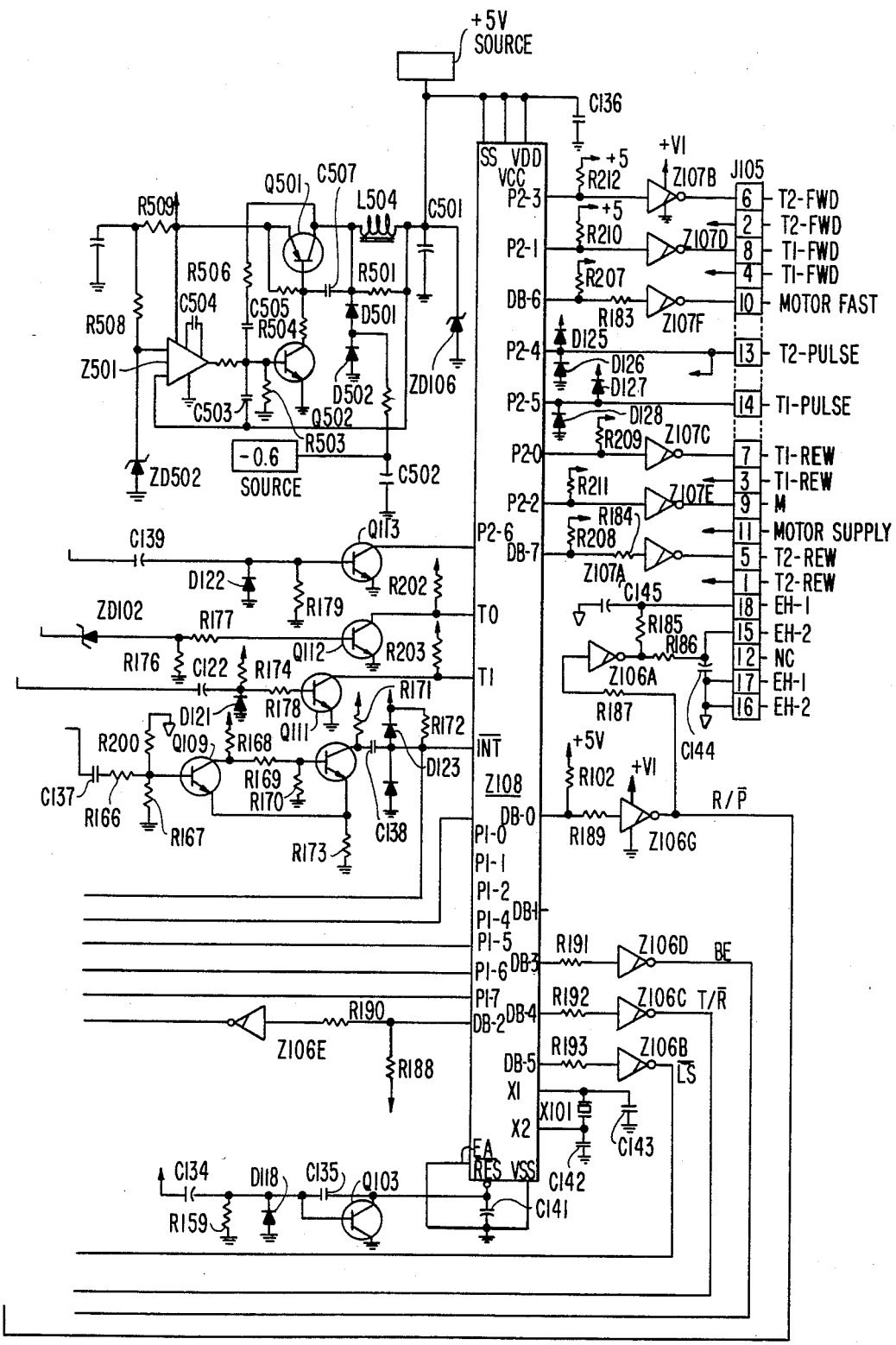
Figure 5A:
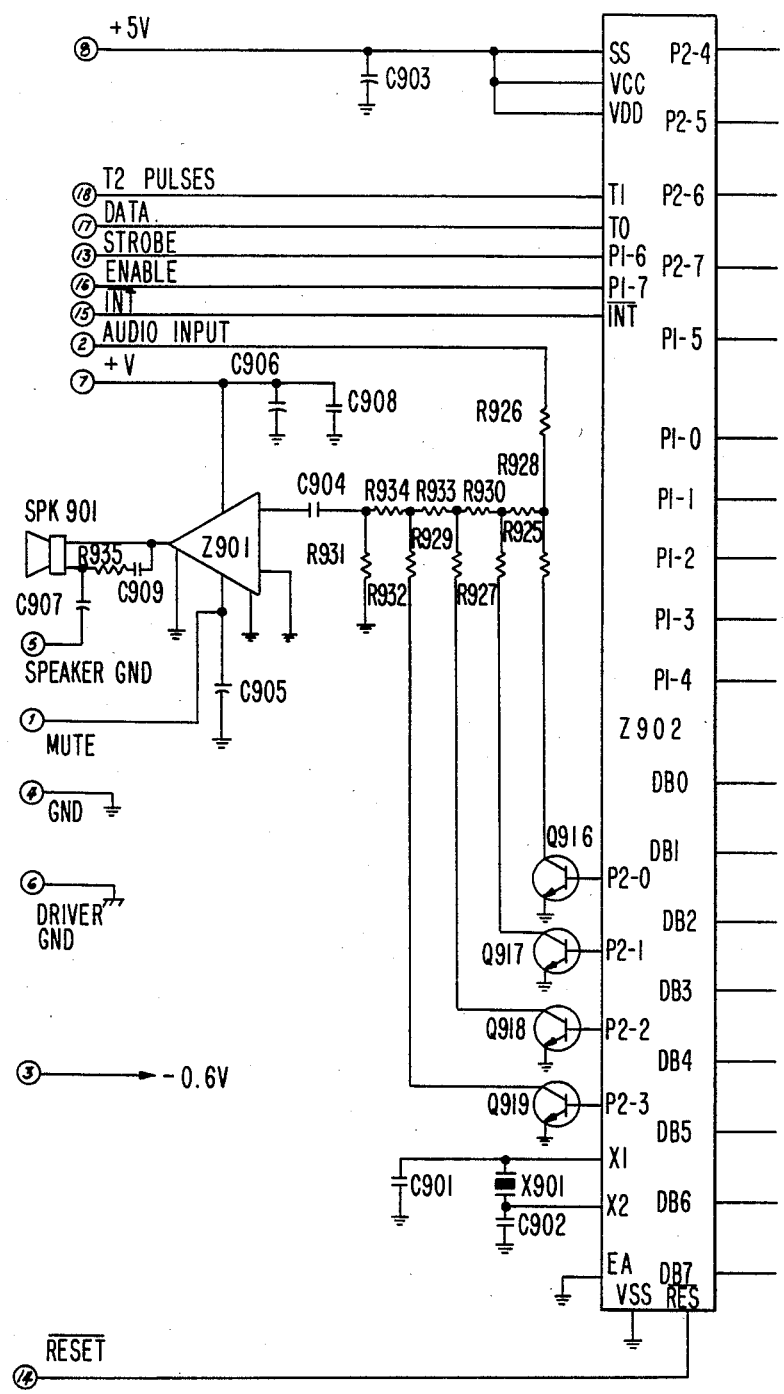
Figure 5B:
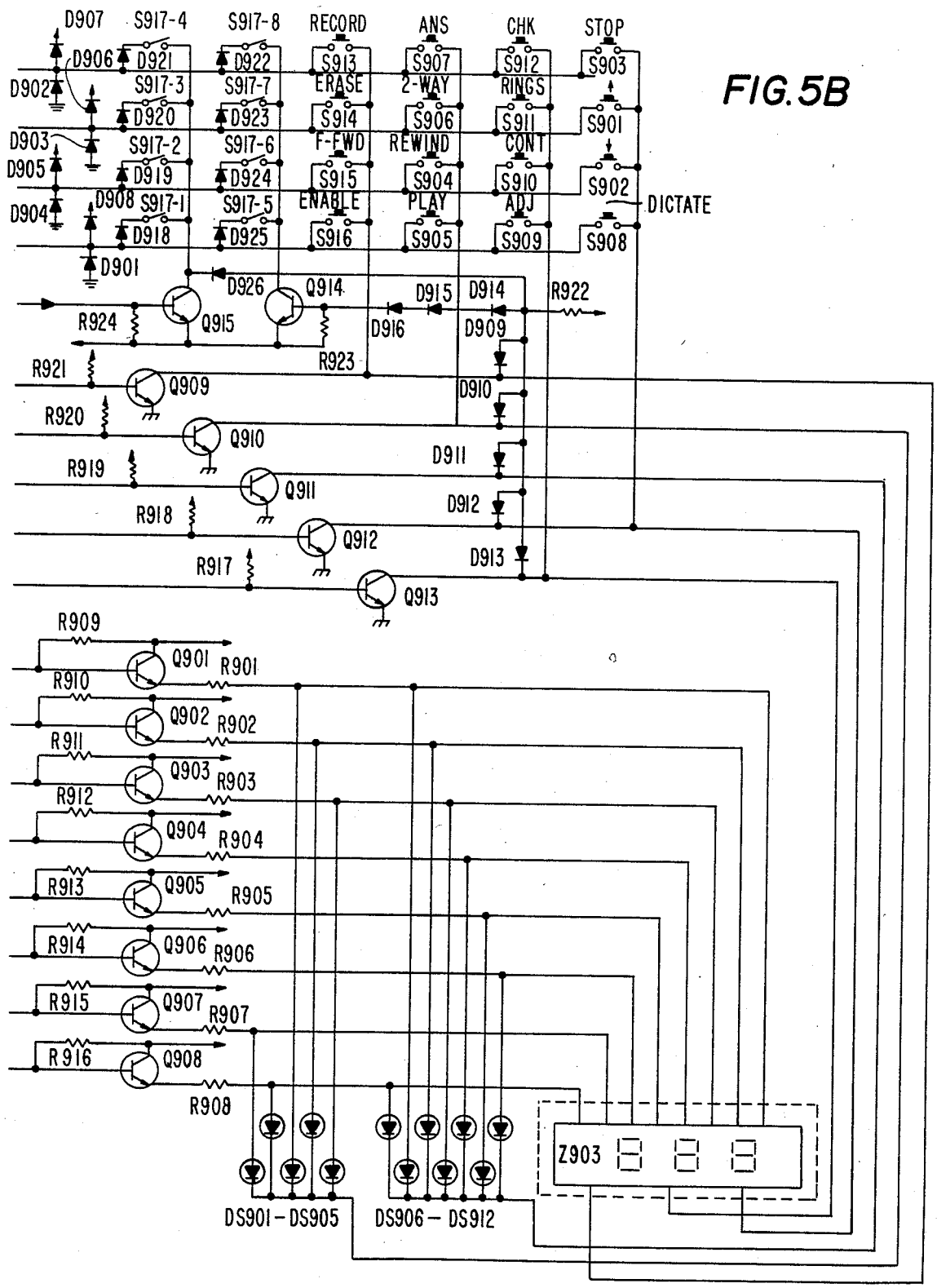

The electronic circuitry for the machine of FIG. 1 is shown in FIGS. 4 and 5. The circuitry includes a master microcomputer Z108 (FIG. 4) and a slave microcomputer Z902 (FIG. 5). The slave microcomputer Z902 of FIG. 5 is controlled by the master microcomputer Z108. It is connected to the various manually operated function switches of FIG. 1, as shown in FIG. 5, as well as to the remote control signal coding switches 8 of FIG. 1, which are designated S917-1, S917-2 ... S917-8 in FIG. 5. The slave microcomputer Z902 of FIG. 5 is also connected through transistors Q901–Q905 to a digital display chip Z903.

The telephone answering machine is normally in its answer mode, awaiting a telephone call. When a proper ring signal is received, and a low "0" level appears at the T0 pin of the master microcomputer Z108. The master microcomputer Z108 initiates the $T_1$ cycle during which the announcement recorded on the T-1 tape is played over the telephone line. When the T-1 announcement is completed, as indicated by a beep recorded on the T-1 tape, the master microcomputer Z108 initiates the $T_2$ cycle, during which incoming audio information is recorded on the T-2 message tape.

When the master microcomputer (Z108) recognizes the preset ring count, it initiates the $T_1$ cycle, during which the T-1 announcement tape is activated and the announcement on the T-1 tape is sent over the telephone line. The end of the $T_1$ cycle is determined by a beep tone which is recorded on the T-1 tape at the end of the outgoing announcement.

When the beep tone recorded on the T-1 tape is recognized, the microcomputer Z108 makes port P2-1 low (0) which releases the T-1 forward solenoid. This action causes the T-1 head plate to retract, ceasing T-1 tape movement. Once T-1 beep tone is recognized and T-1 action ceases, the $T_2$ cycle begins. The $T_2$ cycle begins when the beep tone on the T-1 tape is recognized by the microcomputer Z108. When the $T_2$ cycle begins, the T-2 tape is activated to allow recording of the message received over the telephone line.

Any time during the T-2 cycle, a two second coded remote control signal may be received over the telephone line. This signal is decoded by the slave microcomputer Z902 and fed to the master microcomputer Z108. The microcomputer Z108 will then send a series of beep tones back to the calling party over the telephone line. If the coded remote control signal is again received after the series of beep tones, the microcomputer Z108 will initiate a $T_1$ remote record mode, during which it will rewind the announcement tape T-1, and then signal with a tone that it is ready to record a new announcement. When the tone stops the T-1 record cycle begins, and the calling party may record a new announcement. After an announcement is recorded, and after two seconds of silence have elapsed, the remote signal must be sent again by the calling party to signal the end of the announcement. A beep tone is then placed on the T-1 tape by the microcomputer at the end of the new announcement.

The master microcomputer Z108 then rewinds the T-1 tape and then plays the new announcement over the telephone line. When the beep tone is recognized by the microcomputer Z108, it transfers the machine to the $T_2$ mode. When the T-2 tape is to be actuated in order that messages recorded on that tape may be sent over the telephone line to the calling party, a two second coded remote signal is sent over the telephone line during the $T_2$ mode by the calling party. The machine will then send a series of beep tones over the telephone line. If no remote signal is sent to the machine after the rapid beeps, and if no messages have been recorded, the microcompter Z108 will cause the machine to send a four second tone signal over the telephone line. If messages have been recorded, the microcomputer Z108 will note the current T-2 tape position, and it will then rewind the T-2 tape, sending a beep tone over the telephone line every two seconds to signal that it is rewinding. Once the T-2 tape has been rewound, it will begin to play back the messages over the telephone line.

During the playback period, the machine will stop at the end of each message. If the remote signal is received, the microcomputer Z108 will backspace the T-2 tape. Backspace will continue for as long as the remote signal is present. If the machine is remoted again after it has performed a backspace, it will fast forward to the message where the backspace first occurred.

The T-2 tape position is continually fed to the microcomputer Z108. Once the tape position stored in memory matches the tape position in playback, the machine will stop playing the T-2 tape, and a tone will be transmitted over the telephone line. Another series of beeps will follow after a short silence. If a remote signal is transmitted to the machine after this series of beeps, the machine will go into a remote erase mode and rewind and erase the T-2 tape to the beginning of the current block of messages.

When the coded remote control signal is received by the machine, it is fed to Z103A via Q113, R134, R143, Z104C, R129 and T101. From Z103A it is squared by Schmitt tigger Q109 and Q110 and fed to port "INT" of microcomputers Z108 and Z902 through a differentiator formed by C138 and R172. The resulting negative-going pulses from the differentiator are sampled and their code is determined by the microcomputer Z902. The code of the pulses is compared to the remote key code set on the remote key code switches S917-1 . . . S917-8 of FIG. 5. If the code matches the microcomputer Z902 signal, the machine will initiate a remote operation. The microcomputer Z108 successively sets DB-3 high (1) and low (0), turning the beep oscillator on and off. This causes a series of beep tones to be transmitted over the telephone line to the calling party. DB-3 going high (1) and low (0) causes Z106D to go low (0) and high (1), which operates the twin-T beep oscillator of transistor Q101. The oscillator turns on each time Z106D goes high (1) and turns off each time Z106D goes low (0).

When a coded remote control signal is transmitted to the machine over the telephone line, it signals the microcomputer Z108 to go into the T-1 record mode. The microcomputer Z108 then activates the T-1 rewind solenoid by making P2-0 high (1). This rewinds the T-1 tape until the T-1 tape pulses stop for three seconds at port P2-5. The microcomputer then activates port DB-3 high (1) causing the twin-T oscillator to send a steady beep tone over the telephone line. The oscillator beeps for approximately one second, and T-1 rewind stops. Port P2-0 is now made low (0), and port P2-1 is made high (1), causing the T-1 forward solenoid to pull in. The solenoid in conjunction with the motor activates the T-1 head plate pulling it in and driving the T-1 tape. Port DB-0 is now made low (0), causing the output of driver Z106G to be high (1), activating the T-1 erase head (ER-1) via R187, Z106A and R185. Z106G also allows Z104D to switch on, connecting audio and bias to the record heads. The new announcement from the calling party is now fed through T101, Z104C and Z103A. The output from Z103A is fed to R136 where the AGC circuit maintains a constant recording level. The new announcement audio signal from pin 3 of amplifier Z103A is fed to the T-1 play/record head (RPH1) by way of level setting resistor R151, and switch Z104D. Bias is mixed with the audio signal by resistor R150.

When the coded remote signal is again sent to the machine over the telephone line, and is recognized by the machine, it stops the T-1 tape by removing the high (1) at port P2-1 of microcomputer Z108 which retracts the T-1 head plate. The microcomputer then sets port P2-0 high (1) for 300 ms to rewind the T-1 tape over the coded remote signal recorded at the end of the new announcement. Port P2-0 is then set low (0) and P2-1 is set high (1) bringing in the T-1 head plate. Port DB-3 is then made low (0) activating the beep tone oscillator for two and one-half seconds, the resulting beep tone being recorded on the T-1 tape. Once the beep tone is so recorded, port DB-0 is made high (1), causing Z104D to switch off and port DB-3 is made high (1). P2-1 is made low (0), causing the T-1 forward solenoid to drop out, which allows the T-1 head plate to retract. Port P2-0 is then made high, which brings in the T-1 rewind solenoid activating the rewind mechanism and allowing the T-1 tape to rewind.

Once rewound, the T-1 tape begins to play back by the microcomputer allowing port P2-1 to go high (1) again. This brings in the T-1 forward solenoid, which operates the T-1 head plate. The T-1 tape will start moving forward and play back the new announcement over the telephone line to the calling party for monitoring purposes. The output from the T-1 record/play head (RPH1) is fed to amplifier Z103B via R131 and C151, where it is amplified and fed to Z103A via R197, R134 and C113. From Z103A the output of the record/play head is fed to Z103D via G102, and to the telephone line so that the new announcement may be sent to the calling party for monitoring purposes. The T-1 tape will play back the new announcement until the microcomputer Z108 recognizes the beep tone that was recorded on the T-1 tape at the end of the new announcement. Once the beep tone is recognized at the "INT" port of the microcomputer Z108, it will stop T-1 operation and activate a T-2 cycle. Port P2-1 is now made low (0) and the T-1 forward solenoid will drop out allowing the T-1 head plate to retract stopping the T-1 tape movement. At that time, T-2 forward solenoid will be brought in by activating port P2-3 high (1). Once the T-2 forward solenoid is brought in, it pulls in the T-2 head plate and the pinch roller on the head plate starts moving the T-2 tape. The T-2 tape now records any message present at T101 from the telephone line.

When a T-2 remote operation is to be carried out, a coded remote control signal is again fed through the telephone line at the end of the T-1 cycle to T101 and through amplifier Z103A to microcomputers Z108 and Z902 port "INT" via Schmitt trigger Q109 and Q110. This signal when analyzed by the microcomputer Z902, and if determined to be the same code as the remote code switches activates port DB-3 causing rapid beep tones to be sent over the telephone line to the calling party. If there are no messages on the T-2 tape, and no remote signal is sent to the machine, then, after the period of rapid beeps, the microcomputer Z108 makes port DB-3 low (0), and sends out a two second solid tone over the telephone line informing the calling party that there are no messages on the T-2 tape. This gives the calling party the option of either hanging up, or backspacing into previous message blocks.

If, on the other hand, there are messages on the T-2 tape, and no coded remote control signal is received after the rapid beeps, T-2 will first rewind by the microcomputer activating port DB-7 high (1) causinq the T-2 rewind solenoid to come in. This activates the rewind mechanism and rewinds the T-2 tape back to the beginning of the current message block. When the T-2 tape is rewound to that point, port P2-3 is set high (1). This activates the T-2 forward solenoid which brings in the T-2 head plate and starts the T-2 tape. Audio is fed from the T-2 record/play head (RPH2) through J103-2 to pre-amplifier Z103B, and then into Z103A via R197, R134 and C113. Z103A feeds the audio to the telephone line via Q102, R123, Z103D, R120 and T101. The messages recorded on the T-2 tape are then send to the calling party over the telephone line.

When a backspace is to be performed, another coded remote signal must be sent by the calling party over the telephone line to T101 where it is fed to the Schmitt trigger Q109 and Q110 into port "INT". Port P2-3 now goes low (0), upon recognition of the coded remote signal, causing the T-2 forward solenoid to turn off and allowing the T-2 head plate to drop back. Port DB-7 is now high (1) activating the T-2 rewind solenoid, and the rewind mechanism starts rewinding the T-2 tape. The T-2 tape continues to rewind for the legnth of the remote signal at port "INT". When the remote signal stops at port "INT", port DB-7 goes low (0), the T-2 rewind solenoid drops out. Port P2-3 now goes high (1), activating the T-2 forward solenoid. The T-2 forward solenoid again brings in the T-2 head plate, causing the messages from the record/play head (RPH2) to be fed to the telephone line.

After all of the messages have been played back, the T-2 tape stops. The pulses that have been fed into port P2-4 from the T-2 pulse switch have been counted and stored in memory, and when the pulses that are fed from J105-13 to port P2-4 match the number that are set in the mmeory, the program determines that it is at the end of playback of all the messages and stops the T-2 tape. When port DB-3 is activated low (0) a long tone is sent to the calling party over the telephone line from the Q101 oscillator. The tone is fed through amplifier Z103D to the telephone line. When the tone stops, the user may then backspace for as long as he applies the remote key signal into the telephone. If no signal is received, a series of beeps are transmitted. For that purpose, port DB-3 is alternately activated and de-activated causing oscillator Q101 to be turned on and off, generating the series of rapid beeps. If all messages on the T-2 tape are to be saved, no coded remote control signal is sent to the machine over the telephone line after the playback of the messages. The machine will then rewind T-1 via port P2-0, which now goes high. Port P2-0 in going high (1) turns on the T-1 rewind solenoid, and causes the T-1 tape to rewind until the T-1 pulses stop at port P2-5. When T-1 stops, the machine is ready to answer the telephone line again.

If the messages on the T-2 tape are not to be saved, another coded remote control signal is sent to the machine over the telephone line after the messages have been played back. This latter remote signal tells the microcomputer Z108 to activate port DB-0 low (0), allowing the output of amplifier Z106A to go high (1), turning on the T-2 erase head (EH-2). Port DB-7 also goes high (1) activating the T-2 rewind solenoid. As the T-2 tape rewinds back to the beginning of the current message block, the current block of messages will be erased. The microcomputer Z108, once the T-2 tape is back at the beginning of the current message block, sets port DB-0 high (1), de-activating erase head (EH-2). Port DB-7 now goes low (0), stopping the rewinding of the T-2 tape. The rewinding of the T-1 tape starts when port P2-0 is activated. This activates the T-1 rewind mechanism and rewinds the T-1 tape back to the beginning. The machine is now ready to take another call.

As the T-2 tape moves, it activates the T-2 pulse switch which sends pulses to the master microcomputer Z108 indicating the T-2 tape is moving. If the T-2 tape stops, the pulses will cease which will stop the play operation. The T-2 tape pulses are also fed to the slave microcomputer Z902 which updates the display at each pulse. Play will continue until manually stopped, or until the T-2 pulses cease because of tape breakage or end-of-tape has been reached.

While the T-2 tape is rewinding, T-2 pulses are sent to port P2-4 of the master microcomputer Z108 and to port "T1" of the slave microcomputer Z902. The absence of pulses at P2-4 will tell the master microcomputer Z108 that the rewind function is complete. Three seconds after it is complete, port DB-6 will go low (0) stopping the T-2 drive motor. Port DB-7 will now go low (0) releasing the T-2 rewind mechanism, and port DB-0 will go high (1) de-activating the T-2 erase head (EH-2).

The T-2 pulses fed to port "T1" of the slave microcomputer Z902 decrement the display at a rate of one count per pulse. This enables the display to exhibit the relative tape position.

The remote control signal code is read by the slave microcomputer Z902, and stored in memory. When the correct remote control signal code is detected by the slave microcomputer Z902, it tells the master microcomputer to start the remote program. Remote key code switches are read by P2-4, P2-5, P2-6 and P2-7. The switches are read in two sections 1 through 4, then 5 through 8. If a low (0) is detected at any switch, it indicates it is on. Switches 1 through 4 are enabled by P1-5 which will go high (1) turning on Q915. When a switch is on, the −0.6 VDC at the collector will be presented as a low (0) to the read ports cancelling the voltage drop of the diodes in series with the switches. Switches 5 through 8 will be enabled when all port 1 outputs are low (0). Q114 will be turned on via R922; D914; D915 and D916. When a switch is on the −0.6 VDC at the collector of Q114 will be presented as a low (0) to the read ports cancelling the voltage drop of the diodes in series with the switches.

It will be appreciated that while a particular embodiment of the invention has been shown and described, modifications may be made. It is intended in the following claims to cover all such modifications which come within the true spirit and scope of the invention.

What is claimed is:

1. In a telephone answering machine which stores telephone messages received over a telephone line and which includes a first magnetic tape mechanism (T-1) having a recorded announcement thereon to be transmitted over the telephone line to a caller during a time interval ($T_1$) in response to a telephone call ring signal and having a beep signal recorded thereon at the end of the announcement, and a second magnetic tape mechanism (T-2) for recording messages received over the telephone line during a second time interval ($T_2$) following the time interval ($T_1$), and which responds to a remote control signal received over the telephone line from a caller to effectuate predetermined control operations; the combination of: microcomputer means; circuit means adapted to be coupled to the telephone line for receiving the remote control signal transmitted over the telephone line and for introducing the remote control signal to the microcomputer means; a beep oscillator circuit connected to the microcomputer means to be turned on and off by the microcomputer means, and means coupling the beep oscillator circuit to the telephone line for transmitting beep signals from the oscillator over the telephone line; an input circuit adapted to be coupled to the telephone line for receiving audio signals from the telephone line during the $T_2$ time interval representing a message from a caller and for causing such audio signals to be recorded on the T-2 tape mechanism; an output circuit adapted to be coupled to the telephone line and to the T-1 tape mechanism for transmitting to a caller audio signals representing the announcement and the beep signal recorded on the T-1 tape mechanism; circuit means connecting the microcomputer means to the T-1 and T-2 tape mechanisms for enabling the microcomputer means to control the operation of the tape mechanisms; circuitry connecting the T-1 tape mechanism to the microcomputer means for introducing the beep signal recorded on the T-1 tape to the microcomputer means to stop the T-1 tape mechanism; said microcomputer means responding to the remote control signal received from a caller over the telephone line immediately after the transmission over the telephone line of the beep signal recorded on the T-1 tape to cause the beep oscillator to transmit at least one additional beep signal over the telephone line to the caller; and the microcomputer means, when new messages are recorded on the T-2 tape, causing the T-2 tape to rewind to the point of the last remote operation, and then to reverse and play back the new messages recorded on the T-2 tape over the telephone line to the caller.

2. The combination defined in claim 1, in which, in the event no new messages are recorded on the T-2 tape, the microcomputer means responds to a remote control signal from the caller received over the telephone line immediately after the transmission of the additional beep signal to cause the T-2 tape mechanism to rewind the T-2 tape back any distance, up to its origin position, and then to cause the T-2 tape to play back messages previously recorded thereon over the telephone line to the caller.

3. The combination defined in claim 1, in which the remote control signal is coded in accordance with a predetermined code, and in which the telephone answering machine includes decoding circuitry connected to said microcomputer means and including manually settable switches for enabling the microcomputer means to respond only to a particular coded remote control signal.

4. The combination defined in claim 1, in which said microcomputer means responds to a remote control signal of relatively long duration received over the telephone line during the playback operation of the T-2 tape to cause the T-2 tape to rewind for the duration of the remote control signal for a backspace operation and automatically to resume its playback mode when the remote control signal is terminated.

5. The combination defined in claim 4, in which the microcomputer means responds to a remote control signal of relatively short duration after the backspacing operation to cause the T-2 tape to skip forward to the point at which backspace operation was initiated.

6. The combination defined in claim 1, in which the microcomputer means causes the beep oscillator to transmit at least one additional beep signal over the telephone line after the messages on the T-2 tape have been transmitted to the caller and if no additional remote control signal is received from the caller causes the T-2 tape to stop, and then causes the T-1 tape to rewind to its origin position and to set the machine in condition to respond to the next telephone call.

7. The combination defined in claim 6, in which said microcomputer means responds to the receipt of a remote control signal from the caller over the telephone line immediately after the transmission of the last-named beep signal to the caller to cause the T-2 tape to rewind and the messages recorded thereon to be erased.

8. The combination defined in claim 1, in which the microcomputer means responds to a remote control signal of predetermined duration received immediately after the beep signal recorded on the T-1 tape is transmitted over the telephone line to the caller to cause the beep signal oscillator to transmit a series of beep signals to the caller, and in which the microcomputer means responds to a further remote control signal received after the series of beep signals to cause the T-1 tape to rewind to its origin position, and to condition the T-1 tape to record a new announcement received from the caller over the telephone line.

* * * * *